United States Patent [19]

Hiiro

[11] Patent Number: 4,966,443
[45] Date of Patent: Oct. 30, 1990

[54] LIGHT BEAM SCANNER

[75] Inventor: Hiroyuki Hiiro, Kanagawa, Japan

[73] Assignee: Fuji Photo Film Co., Ltd., Kanagawa, Japan

[21] Appl. No.: 313,675

[22] Filed: Feb. 22, 1989

[30] Foreign Application Priority Data

Feb. 22, 1988 [JP] Japan ................. 63-38936
Feb. 22, 1988 [JP] Japan ................. 63-38937
Feb. 22, 1988 [JP] Japan ................. 63-38938

[51] Int. Cl.$^5$ ............................................. G02F 1/01
[52] U.S. Cl. ........................................ 350/354; 358/75
[58] Field of Search ............... 358/75; 372/3, 24, 18, 372/21, 68, 99, 46; 350/96.13, 354, 355, 392; 250/203 R; 307/425

[56] References Cited

U.S. PATENT DOCUMENTS

| | | | |
|---|---|---|---|
| 4,229,095 | 10/1980 | Mir | 355/4 |
| 4,375,397 | 2/1983 | Mir | 358/75 |
| 4,375,568 | 3/1983 | Mir | 358/75 |
| 4,380,023 | 4/1983 | Mir et al. | 358/75 |
| 4,755,415 | 7/1988 | Iijima et al. | 428/163 |
| 4,849,980 | 7/1989 | Shoji | 372/29 |

FOREIGN PATENT DOCUMENTS 55-67722 5/1980 Japan .

OTHER PUBLICATIONS

Optical Phase Conjugation, Edited by R. A. Fisher Academic Press, 1983. Chap. 13; pp. 467–468.

Primary Examiner—Bruce Y. Arnold
Assistant Examiner—J. P. Ryan
Attorney, Agent, or Firm—Sughrue, Mion, Zinn, Macpeak & Seas

[57] ABSTRACT

A light beam scanner for scanning a light beam not by using an optical part such as a rotary polygon mirror or a galvanometer but by using a phase-conjugate element (or phase-conjugate mirror) having a non-linear light effect to establish a phase conjugate beam due to four-light wave mixing. The phase-conjugate element constitutes a resonator, when irradiated with and excited by a pumping light beam, together with a reflecting face existing in its vicinity so that laser oscillations are effected inbetween. Between the phase-conjugate element and the reflecting face, there are interposed a plurality of optical gates, some of which are opened to constitute a resonator and to generate the laser oscillations and a conjugate laser beam for recording. Thus, the scanning operation can be accomplished by controlling the optical gates to be opened or closed.

19 Claims, 15 Drawing Sheets 16  14          10        21  22

17
  17

16 14 23    10      21   22

LIGHT BEAM SCANNER

BACKGROUND OF THE INVENTION

1. Field of the Invention

The present invention relates to a light beam scanner and, more particularly, to the light beam scanner of a light beam recording system for recording information such as letters in a recording medium by scanning a light beam.

2. Description of the Related Art

As a light beam scanning system for recording information such as letters in a recording medium with a light beam, there is known (in Japanese patent application Laid-Open No. 55 - 67722) a laser computer output microfilmer (which will be shortly referred to a "Laser COM") for recording information such as letters directly in a recording medium such as heat mode recording medium, e.g., a laser direct recording film (LDF) by scanning a laser beam which is modulated on the basis of the output information of a computer, for example. The Laser COM has its light beam scanner constructed of: a rotary polygon mirror for deflecting the laser beam, which is emitted from an argon laser and modulated in accordance with the letter information or the like, in a main scanning direction; and a galvanometer having a deflecting mirror for deflecting the light reflected from the rotary polygon mirror in an auxiliary scanning direction, so that the letter information or the like may be recorded by scanning the recording medium with the laser beam through a scanning lens by the rotary polygon mirror and the galvanometer.

However, the light beam scanner using the rotary polygon mirror and the galvanometer is troubled by a problem that its accuracy is degraded with time due to the wear or the like of a moving part. On the other hand, the rotary polygon mirror is turned at a constant speed by a motor to deflect the laser beam in the main scanning direction so that the mirror face is inclined due to the inclination or the like of the shaft of the motor. The inclination of the mirror face causes irregular scans in the auxiliary direction. In order to prevent the irregular scanning, a correcting optical system is required, and consequently another problem that the light beam scanner is large-sized occurs.

SUMMARY OF THE INVENTION

The present invention has been conceived to solve the above-stated problems and has an object to provide a light beam scanner which is improved in realiability and small-sized by eliminating the moving part through a scanning operation using a phase conjugate element.

In order to achieve this object, according to a first feature of the present invention, there is provided a light beam scanner which comprises: a phase-conjugate element; a light source for emitting a pumping light beam for exciting said phase-conjugate element; a reflecting mirror arranged to have its reflecting face facing said phase-conjugate element; an optical control element interposed between said phase-conjugate element and said reflecting mirror and having a plurality of optical gates juxtaposed to each other in a scanning direction; and a controller for controlling said optical gates to be opened or closed.

According to the present invention, the light beam is scanned by using not the optical parts such as the rotary polygon mirror or the galvanometer but the phase-conjugate element (or phase-conjugate mirror) having a non-liner optical effect to establish the phase conjugate by a four-light wave mixing. The phase-conjugate element constitutes, when excited by irradiating it with the pumping light beam, a resonator together with the reflecting face existing in the vicinity of the phase-conjugate element to cause the laser oscillations in between. By these laser oscillations, a laser beam is radiated along a straight line joining the phase-conjugate element and the reflecting face. Between the reflecting face and the phase-conjugate element, according to the first feature of the present invention, there is interposed the optical control element which is equipped with a plurality of optical gates juxtaposed to each other in the scanning direction. If these optical gates are left closed, the resonator is not constituted between the reflecting face and the phase-conjugate element so that no laser beam is generated. If, however, the optical gates are opened, the reflecting face and the phase-conjugate element face each other at the portion corresponding to the opened optical gates, so that the resonator is constituted to cause the laser oscillations. As a result, the laser beam is radiated sequentially in the scanning direction by opening the optical gates sequentially so that the scanning with the laser beam can be accomplished.

Between the reflecting face and the phase-conjugate element, according to a second feature of the present invention, there is interposed of an optical control element which has a plurality of rows of optical gate rows juxtaposed to one another in the main scanning direction and each composed of a plurality of optical gates. If these optical gates are left closed, no resonator is constituted between the reflecting face and the phase-conjugate element so that no laser beam is produced. If the optical gates are opened, on the other hand, the reflecting face and the phase-conjugate element are caused to face each other at the portion corresponding to the opened optical gates so that the resonator is constituted to cause the laser oscillations. By sequentially opening the optical gates in a given row, a conjugate laser beam is generated sequentially in the main scanning direction so that the main scanning of the laser beam can be accomplished. By selecting the optical gate rows sequentially, on the other hand, the auxiliary scanning can be accomplished.

In order to achieve the above objective, according a third feature of the present invention, there is provided the light beam scanner which comprises: a phase-conjugate element group composed of a plurality of phase-conjugate elements juxtaposed to each other in a scanning direction; a light source for emitting a pumping light beam for exciting said Plural phase-conjugate elements; a reflecting mirror arranged to have its reflecting face facing said phase-conjugate element group; an optical control element interposed between said phase-conjugate element group and said reflecting mirror and having a plurality of optical gates juxtaposed to each other in said scanning direction; and a controller for controlling said optical gates to be opened or closed.

According to the third feature of the present invention, the plural phase-conjugate elements are juxtaposed to each other in the scanning direction, and the reflecting mirror is arranged to have its reflecting face facing the phase-conjugate element group. The optical control elements having the plural optical gates juxtaposed to each other in the scanning direction are arranged between the reflecting face and the phase-conjugate elements. If these optical gates are left closed, no resonator is constituted between the reflecting face and the phase-conjugate elements so that no laser beam is produced. If, however, the optical gates are opened, both the reflecting face and the phase-conjugate elements corresponding to the opened optical gates face each other so that the resonator is constituted to cause the laser oscillations. Thus, by opening the optical gates sequentially, the laser beam is oscillated sequentially in the scanning direction so that the scanning with the laser beam can be accomplished.

As has been described above, according to the present invention, the non-linear light effect is utilized, and the scanning with the light beam is accomplished by opening or closing the optical gates. As a result, the scanning can be accomplished without any use of moving parts to raise an effect that it is possible to provide an optical beam scanner of a small size but with a high reliability.

DESCRIPTION OF THE PREFERRED EMBODIMENTS

The present invention will be described in detail in the following in connection with the embodiments thereof with reference to the accompanying drawings.

Figure 1:
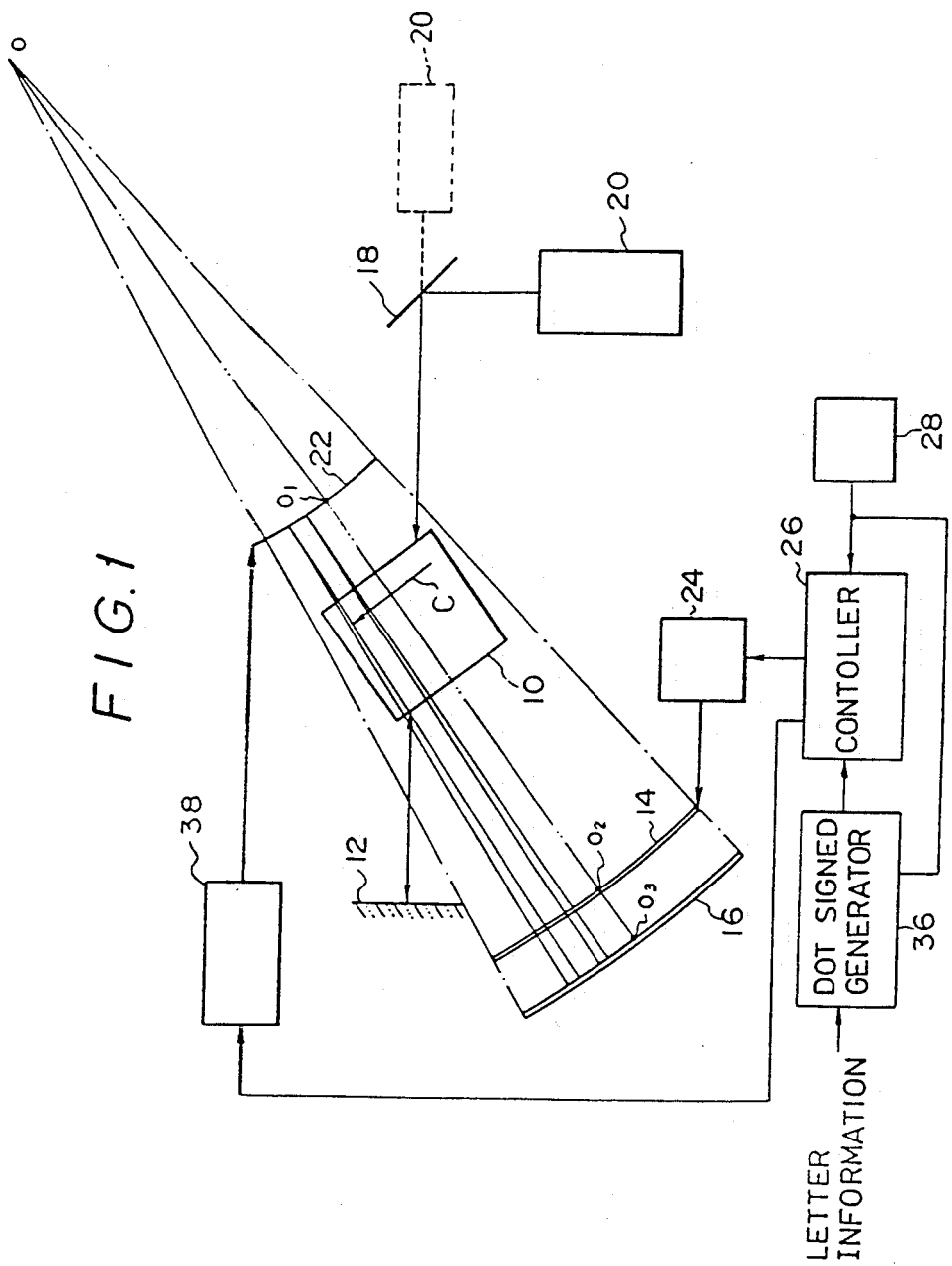
FIG. 1 is a schematic diagram showing a first embodiment of the present invention.

A first embodiment of the present invention will be described in the following. As shown in FIG. 1, a plane mirror 12 and a beam splitter 18 are arranged to interpose in between a cubic phase-conjugate element 10 which is made of a crystal of barium titanate ($BaTiO_3$) In the vicinity of that beam splitter 18, there is arranged a laser oscillator 20 for introducing a laser beam at an angle of incidence of 45 degrees into the beam splitter 18. Thus, the laser beam emitted from the laser oscillator 20 is reflected into the phase-conjugate element 10 by the beam splitter 18. This incident laser beam is partially absorbed by the phase-conjugate element 10 but is mostly allowed to pass through the phase-conjugate element 10 to reach the plane mirror 12 until it is reflected by the plane mirror 12 again into the phase-conjugate element 10. Then, the laser beam incident upon the phase-conjugate element 10 from the beam splitter 18 and the laser beam incident upon the phase-conjugate element 10 from the plane mirror 12 act as two pumping light beams so that the phase-conjugate element 10 is excited by absorbing the energies of those pumping light beams.

Incidentally, the position of the laser oscillator 20 may be changed while omitting beam splitter 18 so that the laser beam emitted from the laser oscillator 20 may be incident directly upon the phase-conjugate element 10 as shown at broken lines in FIG. 1. The beam splitter 18 will be able to be likewise omitted in second to fourth embodiments to be described in the following.

Figure 2:
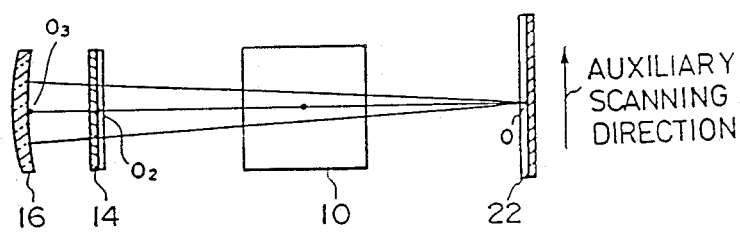
FIG. 2 is a longitudinal sectional view of FIG. 1 showing the arrangement of a phase-conjugate element, an optical control element, a concave mirror and a recording medium.

Moreover, a concave mirror 16 having its center of curvature at 0 and a recording medium 22 are arranged to interpose the phase-conjugate element 10 inbetween, and an optical control element 14 is interposed between the phase-conjugate element 10 and the concave mirror 16. This concave mirror 16 has its reflecting face arranged to face the phase-conjugate element 10, and the recording medium 22 is curved along the side of a circular cylinder, the bottom of which has a radius $OO_1$ on the center of curvature 0 of the concave mirror 16, and is arranged to have its center $O_1$ coinciding with the focal point of the concave mirror 16. The recording medium 22 is fed at a constant speed in an auxiliary scanning direction, as indicated at an arrow in FIG. 2, by a driver 38. The straight line joining the center $O_3$ of the concave mirror 16 and the center $O_1$ of the recording medium 22 intersects the optical axis of the phase-conjugate element 10. MOreover, the optical control element 14 is curved along the side of a circular cylinder, the bottom of which has a radius $OO_2$ on the center of curvature O, and arranged to have its center $O_2$ positioned on the straight line $OO_3$.

Figure 3:
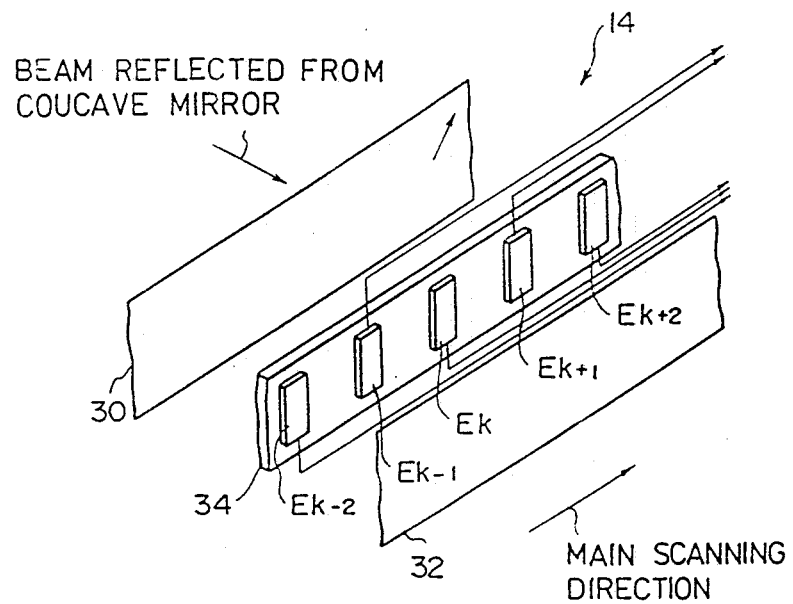
FIG. 3 is an exploded perspective view showing a portion of the optical control element.

The optical control element 14 is composed, as shown in FIG. 3, of: a polarizer 30; an analyzer 32 arranged to have a polarizing plane at an angle of 90 degrees with respect to the polarizer 30; and a PLZT substrate ((Pb, LA) (Zr, Ti)$O_3$) 34 interposed between the polarizer 30 and the analyzer 32. The PLZT substrate 34 is arranged with a plurality of electrodes- - -, $E_{k-1}$, $E_k$, $E_{k+1}$, - - - at an equal pitch. These electrodes can be made of alloy of Au and Dr or $In_2O_3$ and are individually connected with a driver 24 so that they can apply their voltages independently. The optical control element 14 is so interposed between the phase-conjugate element 10 and the concave mirror 16 that its electrodes are arranged in the main scanning direction. When the light beam is emitted from the polarizer 30 of the optical control element 14, it is linearly polarized through the polarizer 30 to irradiate the PLZT substrate 34. If, at this time, the voltages are applied to the adjoining electrodes of the PLZT substrate 34, the light beam passing through the gaps between the electrodes of the PLZT substrate 34 is subjected to a phase change proportional to the square of the electric field so that it is transformed into a polarized elliptical beam. This beam irradiates the analyzer 32 so that only its component coincident with the polarizing face of the analyzer 32 passes through the analyzer 32. As a result, the gaps between the electrodes act as the optical gates so that the optical gates receiving no electric field are left closed, but the optical gates receiving the electric field are opened to pass the light beam therethrough.

When the optical gates are opened, as above, the portions of the concave mirror 16 corresponding to the opened optical gates and the phase-conjugate element 10 are caused to face each other thereby to constitute the resonator so that the laser beam can be oscillated on the straight line joining the aforementioned portions of the concave mirror 16 and the phase-conjugate element 10 and focused on the recording medium 22 for the recording operations. Since these recording operations are thus accomplished with the laser beam passing through the optical gates constituted by the adjoining electrodes, the number of the optical gates is equalized to the total number of the dots to be recorded on one line in the main scanning direction. As a result, the number of the electrodes is larger by one than the total number of the dots.

The aforementioned driver 24 is connected with a controller 26. With this controller 26, there is connected a pulse oscillator 28 for receiving a pulse signal which is composed of a train of pulses generated at a predetermined interval. This pulse signal is inputted to a dot signal generator 36 for converting the letter information or the output of a computer into a dot signal. The dot signal generator 36 converts the letter information into the dot signal by using the pulse signal as a synchronizing signal.

Figure 4:
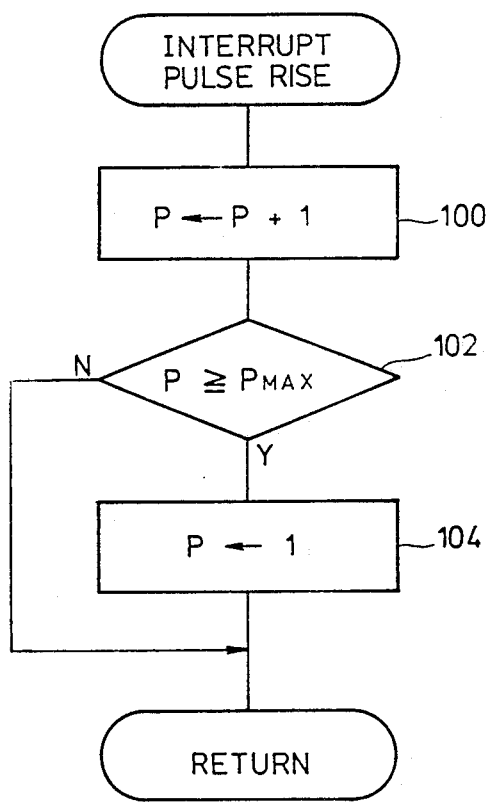
FIG. 4 is a flow chart showing a pulse rise interruption routine.

Next, the control routine of the driver 24 by the controller 26 will be described in the following. FIG. 4 presents an interruption routine which is interrupted at the rise of the pulse signal inputted from the pulse oscillator 28 immediately after the feed of the recording medium in the auxiliary direction has been started. At Step 100, a pulse number P initialized to 0 is incremented. At Step 102, it is determined whether or not the pulse number P exceeds its maximum $P_{MAX}$. If the pulse number P exceeds its maximum $P_{MAX}$, it is reduced to 1 at Step 104 so as to restore the start point of the main scanning. The maximum $P_{MAX}$ of the pulse number is equalized to the total number of the electrodes mounted on the PLZT substrate 34.

Figure 5:
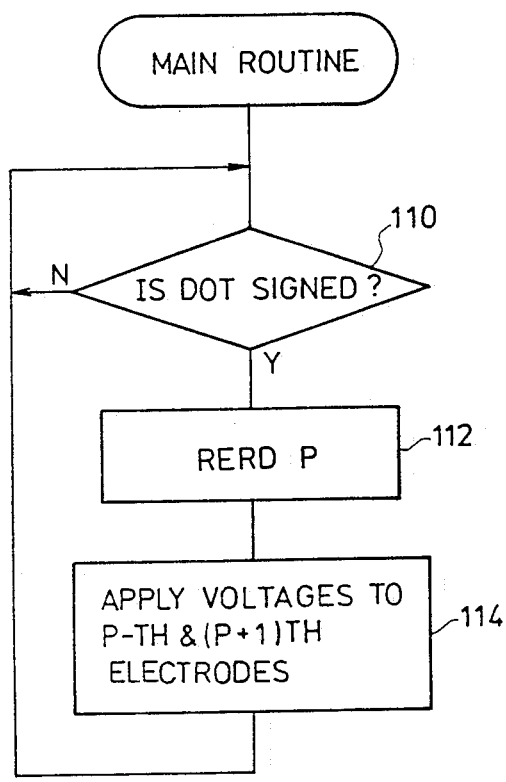
FIG. 5 is a flow chart showing a main routine for controlling an application to electrodes.

FIG. 5 presents the main routine, in which it is determined at Step 110 whether or not the dot signal is inputted. When the dot signal is inputted, the pulse number P counted in the interruption routine of FIG. 4 is read in at Step 112, and the voltage is applied to the P-th and (P+1)th electrodes at Step 114. As a result, the optical gates are opened between a P-th electrode $E_P$ and the (P+1)th electrode $E_{P+1}$ so that the laser beam is converged into a beam spot having a size of several microns on the recording medium 22 and recorded in the form of dots on the recording medium 22, as has been described hereinbefore.

Figure 6:
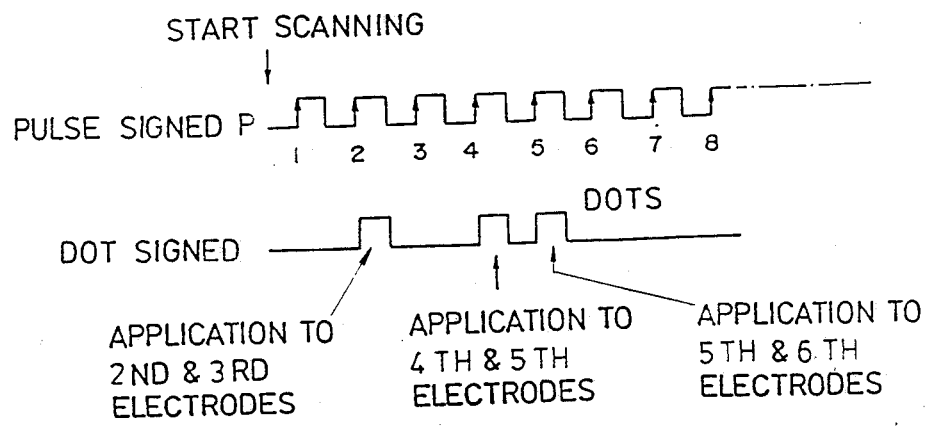
FIG. 6 is a diagram showing the relations among a pulse signal, a pulse number and a dot signal.

FIG. 6 is a diagram showing the correspondence among the pulse signal, the pulse number P, the dot signal and the voltage applying electrodes when the controls thus far described are accomplished. If the dot signal for recording the dots is inputted when the pulse number P is 2, the voltages are applied to the second and third electrodes. For the pulse numbers of 4 and 5, on the other hand, the voltages are applied to the fourth and fifth electrodes and the fifth and sixth electrodes, respectively.

As has been described hereinbefore, according to the present embodiment, the recording medium has to be fed for the auxiliary scanning, but the main scanning can be accomplished without any use of moving parts.

Figure 7:
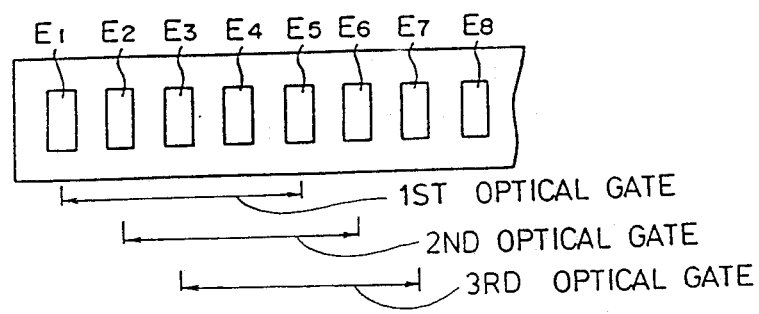
FIG. 7 is a diagram showing another embodiment of optical gates.

Incidentally, the embodiments thus far described is directed to the example in which the voltages are applied to the adjoining electrodes to record the information in the recording medium. In case, however, a heat mode recording medium is used, a laser beam of high output is required and then may be produced by using as one optical gate the region containing a plurality of adjoining electrodes as shown in FIG. 7. In this case, the electrodes to be used may preferably be transparent.

Figure 8:
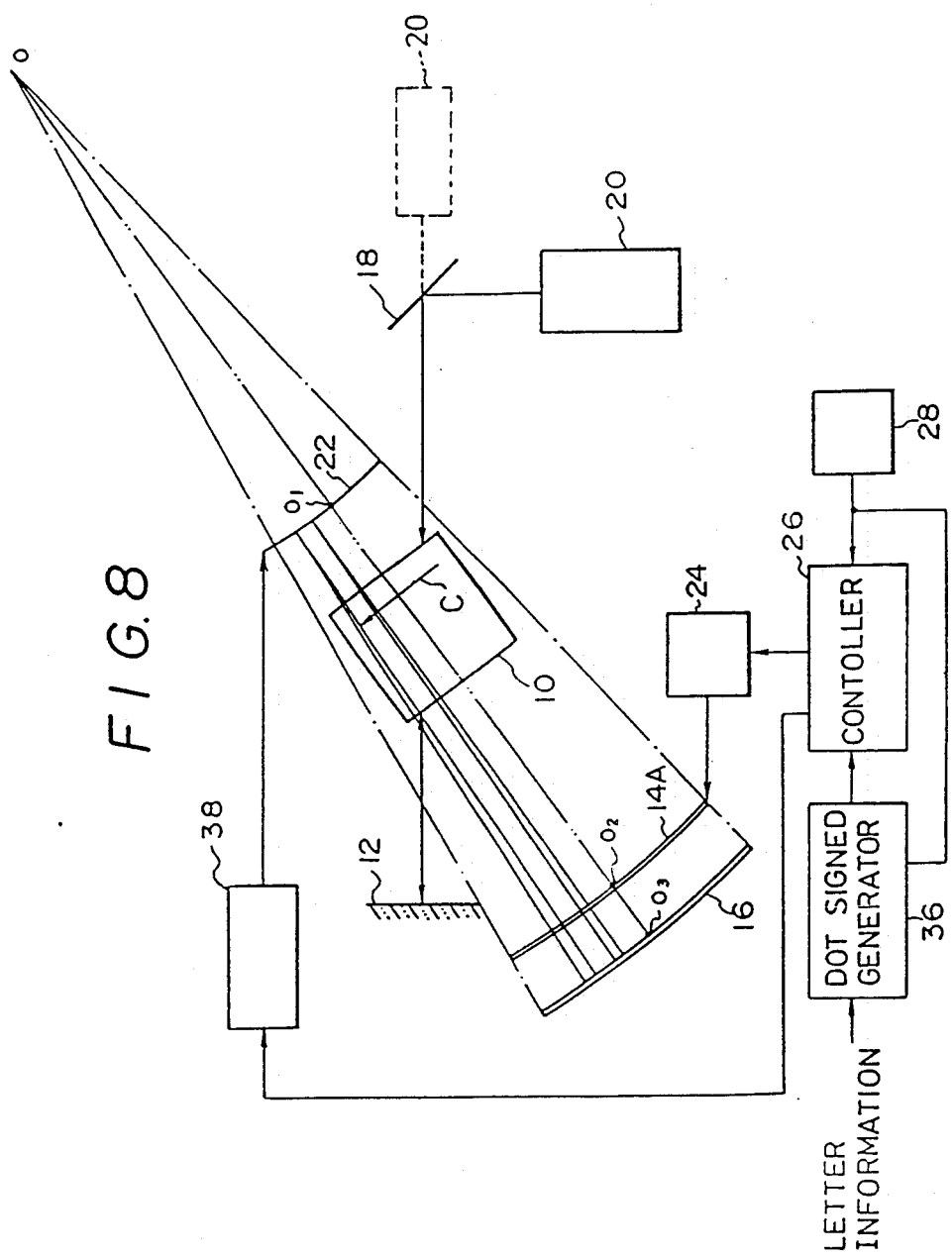
FIG. 8 is a schematic diagram showing a second embodiment of the present invention.
Figure 9:
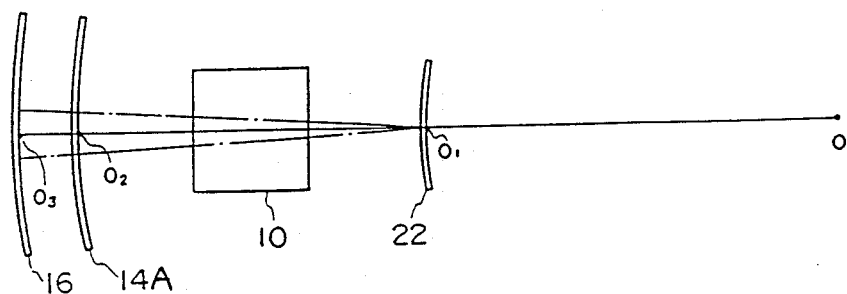
FIG. 9 is a longitudinal sectional view of FIG. 8.

Next, a second embodiment of the present invention will be described in the following. FIG. 8 is a schematic diagram showing the second embodiment, and the portions shared with FIG. 1 are designated at the common reference characters so that their descriptions are omitted. As shown in FIGS. 8 and 9, the recording medium 22 of the present embodiment is curved along the spherical plane of the radius $OO_1$ taken at the center of curvature 0 of the concave mirror 16 and is arranged to have its center $O_1$ located at the focal point of the concave mirror 16. The recording medium 22 is fed by one frame in the main or auxiliary scanning direction by the driver 38 after the recording of one frame has been finished. The straight line joining the center $O_3$ of the concave mirror 16 and the center $O_1$ of the recording medium 22 intersects the optical axis C of the phase-conjugate element 10. Moreover, an optical control element 14A is curved along the spherical plane of the radius $OO_2$ taken at the center of curvature O and is arranged to have its center $O_2$ located on the straight line $OO_3$. Incidentally, broken lines designate the position of the laser oscillator 20 in case no beam splitter is used.

Figure 10:
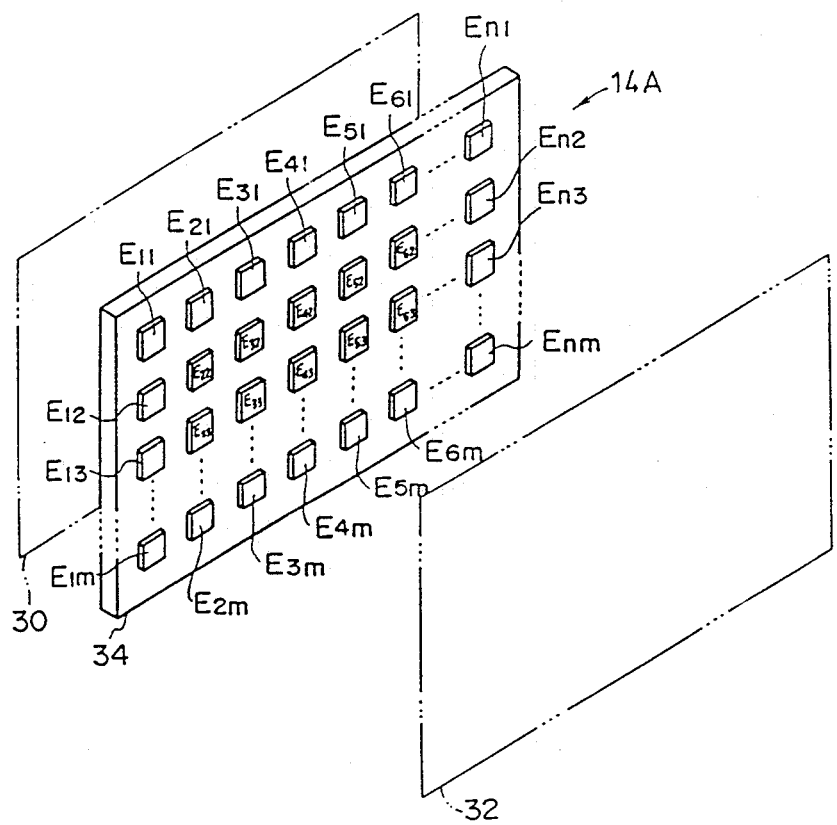
FIG. 10 is an exploded perspective view showing another optical control element.

The optical control element 14A is composed, as shown in FIG. 10, of: the polarizer 30; the analyzer 32 arranged to have its polarizing plane forming an angle of 90 degrees with respect to the polarizing plane of the polarizer 30; and the PLZT substrate 34 interposed between the polarizer 30 and the analyzer 32. The PLZT substrate 34 is arranged with a plurality of electrodes $E_{11}$, $E_{21}$, $E_{31}$, - - -, and $E_{nm}$. As has been described hereinbefore, these electrodes can be made of the alloy of Au and Cr or $In_2O_3$ and are so connected with the driver 24 they can apply their voltages independently. The optical control element 14A thus constructed is so arranged between the phase-conjugate element 10 and the concave mirror 16 that the row (as taken in the horizontal direction of FIG. 10) composed of an n-number of electrodes is arrayed in the main scanning direction. The optical control element 14A has its optical gates opened, when supplied with the electric field, as has been described in connection with the optical control element 14 shown in FIG. 3.

When the optical gates are opened, the portions of the concave mirror 16 corresponding to the opened optical gates and the phase-conjugate element 10 are caused to face each other thereby to constitute the resonator so that the laser beam can be oscillated on the straight line joining the aforementioned portions of the concave mirror 16 and the phase-conjugate element 10 and focused on the recording medium 22 for the recording operations. Since these recording operations are thus accomplished with the laser beam passing through the optical gates which are constituted by the adjoining electrodes arrayed in the main scanning direction, the number of the optical gates forming one optical gate row is equalized to the total number (i.e., n−1 because the electrode number is designated at n) of the dots to be recorded on one line in the main scanning direction. Moreover, these optical gate rows are arrayed in the same number as that of the scanning lines (m) to be recorded in one frame.

Figure 11:
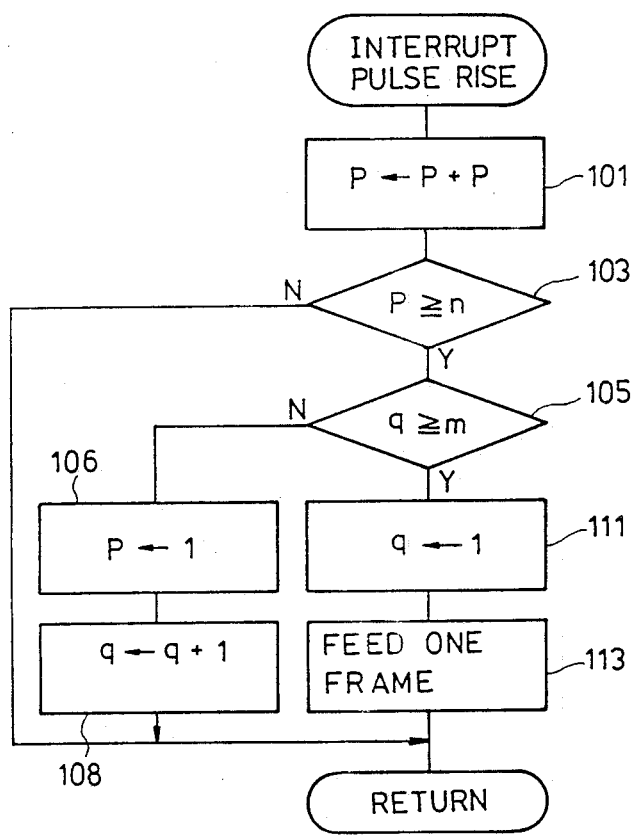
FIG. 11 is a flow chart showing a pulse rise interruption routine when the optical control element shown in FIG. 10 is to be controlled.

Next, the control routine of the driver 24 by the controller 26 will be described in the following. FIG. 11 shows an interruption routine which is interrupted at the rise of the pulse signal inputted from the pulse oscillator 28 immediately after the information recording has been started. At Step 101, a pulse number P initialized to 0 is incremented. At Step 103, it is determined whether or not the pulse number P exceeds the total number n of the electrodes in one electrode row. At Step 105, it is determined whether or not a count number q for counting the number of electrode rows exceeds the total number m of the electrode rows. Here, the count number q has been initialized to 1. For $P \geq n$ and $q < m$, it is determined that all the electrodes of one electrode row have been counted. Then, the pulse number P is set at 1 at Step 106, and the count number q is incremented at Step 108. For $P \geq n$ and $q \geq m$, on the other hand, it is determined that the recording of one frame of the recording medium has been finished. Then, the count number q is set at 1 at Step 111, and the driver 38 is controlled at Step 113 to feed the recording medium by one frame in the auxiliary scanning direction.

Figure 12:
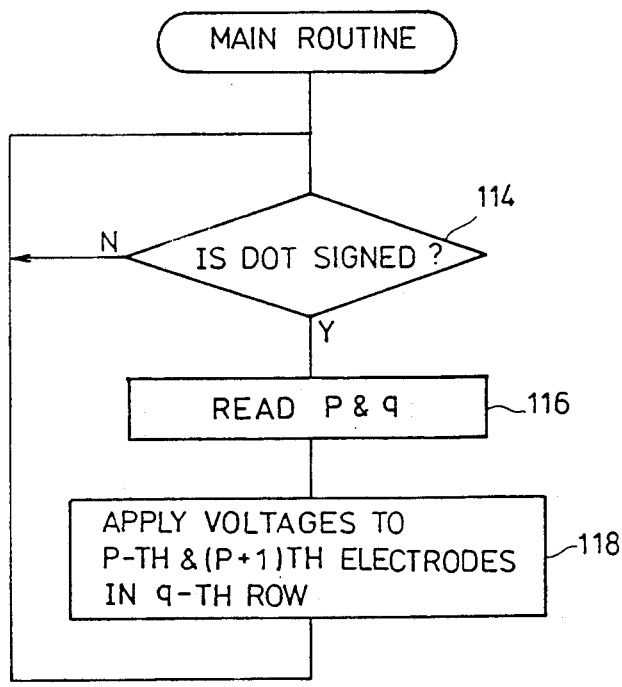
FIG. 12 is a flow chart showing a main routine for controlling an application to the electrode of the optical control element shown in FIG. 10.

FIG. 12 presents the main routine, in which it is determined at Step 115 whether or not the dot signal is inputted. When the dot signal is inputted, the pulse number P and count number q counted in the interruption routine of FIG. 11 is read in at Step 116, and the voltage is applied to the P-th and (P+1)th electrodes in the q-th row at Step 118. As a result, the optical gates are opened between a P-th electrode $E_P$ and the (P+1)th electrode $E_{P+1}$ so that the laser beam is converged into a beam spot having a size of several microns on the recording medium 22 and recorded in the form of dots on the recording medium 22, as has been described hereinbefore.

Figure 13:
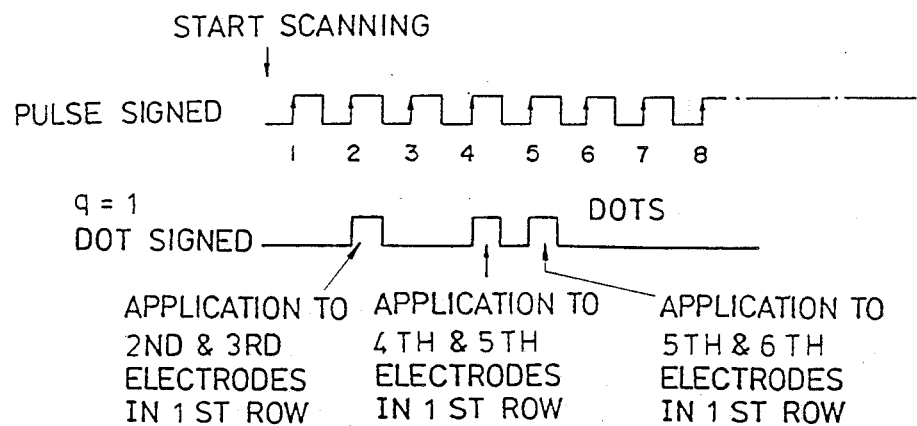
FIG. 13 is a diagram showing the relations among a pulse signal, a pulse number and a dot signal.

FIG. 13 is a diagram showing the correspondence among the pulse signal, the pulse number P, the dot signal, the voltage applying electrodes and so on when the controls thus far described are accomplished. If the dot signal for recording the dots is inputted when the count number 1 is 1 and when the pulse number P is 2, the voltages are applied to the second and third electrodes in the first row. For the pulse numbers of 4 and 5, on the other hand, the voltages are applied to the fourth and fifth electrodes and the fifth and sixth electrodes in the first row, respectively.

As has been described hereinbefore, according to the present embodiment, the main and auxiliary scannings in case one frame is to be recorded can be accomplished without using any moving part.

Figure 14:
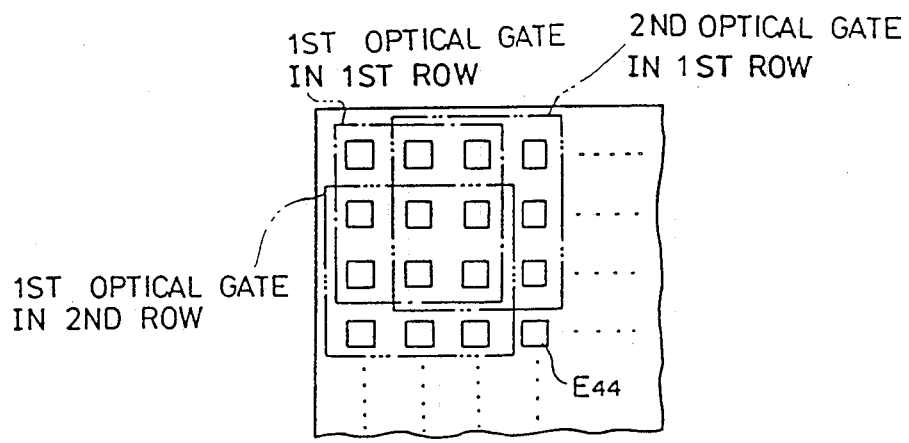
FIG. 14 is a diagram showing another example of the optical gates.

Incidentally, the embodiments thus far described is directed to the example in which the voltages are applied to the adjoining electrodes to record the information in the recording medium. In case, however, a heat mode recording medium is used, a laser beam of high output is required and then may be produced by using as one optical gate the region containing a plurality of adjoining electrodes, as shown in FIG. 14. In this case, the electrodes to be used may preferably be transparent.

The foregoing first and second embodiments are exemplified by using as the reflecting mirror the concave mirror, which may be replaced by a plane mirror.

Next, a third embodiment of the present invention will be described with reference to FIG. 15. Here in FIG. 15, the parts shared with FIG. 1 are designated at the common reference characters, and their descriptions will be omitted.

Figure 15:
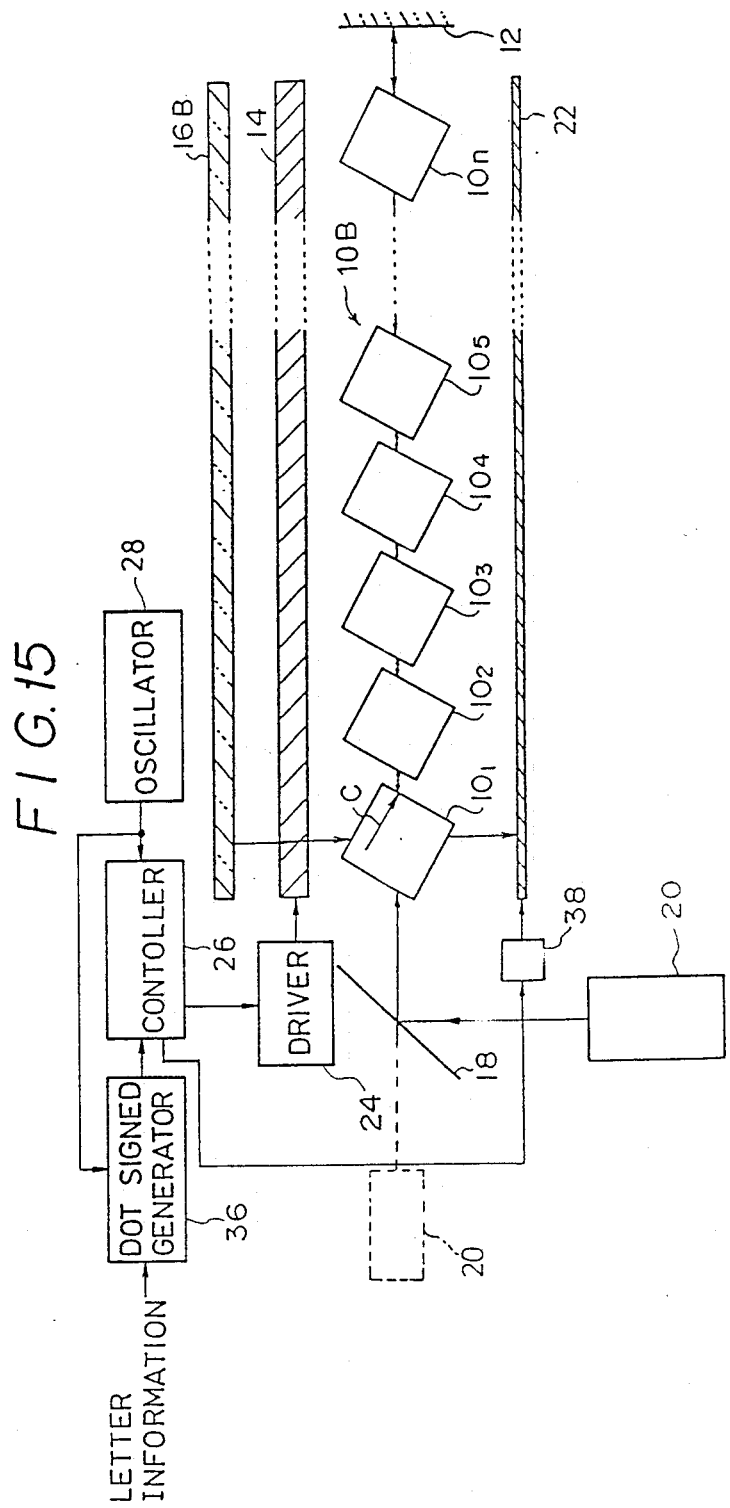
FIG. 15 is a schematic diagram showing a third embodiment of the present invention.

As shown in FIG. 15, an n-number of cubic phase-conjugate elements $10_1, 10_2, 10_3, ---,$ and $10_n$ made of a crystal of barium titanate ($BaTiO_3$) are equidistantly juxtaposed in the main scanning direction to constitute a phase-conjugate element group 10B. The plane mirror 12 and the beam splitter 18 are arranged to interpole that phase-conjugate element group 10B between thereof. In the vicinity of the beam splitter 18, there is arranged the laser oscillator 20 for emitting the laser beam into the beam splitter 18 at an angle of incidence of 45 degrees. If the beam splitter is not used, the laser oscillator 20 is positioned, as indicated by broken lines. The laser beam oscillated from the laser oscillator 20 is reflected by the beam splitter 18 into the phase-conjugate element $10_1$. This incident laser beam is partially absorbed by the phase-conjugate element $10_1$ but mostly allowed to pass through the phase-conjugate elements $10_1, 10_2, ---,$ and $10_n$ sequentially, while being absorbed thereby, until it reaches the plane mirror 12. The laser beam having passed is reflected again by the plane mirror 12 into the phase-conjugate element $10_n$ and is allowed to pass through the phase-conjugate elements $10_n, 10_{n-1}, ---,$ and $10_1$ sequentially but in the opposite direction until it reaches the beam splitter 18. Then, the laser beam introduced from the beam splitter 18 into the phase-conjugate element group 10B and the laser beam returned from the reflecting mirror 12 to the phase-conjugate element group 10B form the two pumping light beams so that the individual phase-conjugate elements in their group are excited while absorbing the energies of the pumping light beams.

Moreover, the plane mirror 16B and the recording medium 22 are arranged in parallel to interpose the phase-conjugate element group 10B between thereof, and the optical control element 14 is arranged between the phase-conjugate element group 10B and the plane mirror 16B and in parallel with the plane mirror 16B. This plane mirror 16B is arranged to have its reflecting face facing the phase-conjugate element group 10B. The aforementioned recording medium 22 is fed at a constant speed in the auxiliary scanning direction (normal to the paper face of FIG. 15) by the driver 38. Incidentally, the letter C designates the optical axis of the phase-conjugate element group.

The optical control element 14 has a structure identical to that of the optical control element described with reference to FIG. 3 so that the recording operations can be accomplished by opening the optical gates when supplied with the electric field. Since these recording operations are thus accomplished with the laser beam passing through the optical gates constituted by the adjoining electrodes, the number of the optical gates is equalized to the total number (i.e., n−1 because the electrode number is set at n) of the dots to be recorded on one line in the main scanning direction. As a result, the electrode number is larger by 1 than the number of the dots.

The routine for opening or closing the optical gates by the control circuit 26 is similar to that shown in FIGS. 4 and 5, and the correspondences among the pulse signal, the pulse number and the voltage-applied electrodes are similar to those shown in FIG. 6.

As has been described hereinbefore, according to the present embodiment, the main scanning can be accomplished by using no moving part.

Incidentally, the embodiments thus far described is directed to the example in which the voltages are applied to the adjoining electrodes to record the information in the recording medium. In case, however, a heat mode recording medium is used, a laser beam of high output is required and then may be produced by using as one optical gate the region containing a plurality of adjoining electrodes, as has been described with reference to FIG. 7. In this case, the electrodes to be used may preferably be transparent.

Next, a fourth embodiment of the present invention will be described with reference to FIG. 16. In the present embodiment, a plurality of phase-conjugate elements $10_{11}$, $10_{21}$, - - -, and $10_{n1}$ are juxtaposed to each other in the main scanning direction to constitute a phase-conjugate element row. A plurality of these phase-conjugate element rows are juxtaposed to each other in the auxiliary scanning direction to array the phase-conjugate elements $10_{11}$, $10_{21}$, - - -, and $10_{nm}$ in a grid shape thereby to constitute the phase-conjugate element group. In order to excite this phase-conjugate element group, beam splitters $18_1$, $18_2$, - - -, and $18_m$ which correspond to the phase-conjugate element rows, respectively. Like the foregoing embodiments, the individual phase-conjugate element rows are irradiated with the pumping light beams by the single laser oscillator 20. Here, if the beam splitters $18_1$ to $18_m$ are not used, the laser oscillators $20_1$ to $20_m$ are arranged at the positions indicated by broken lines.

Figure 16:
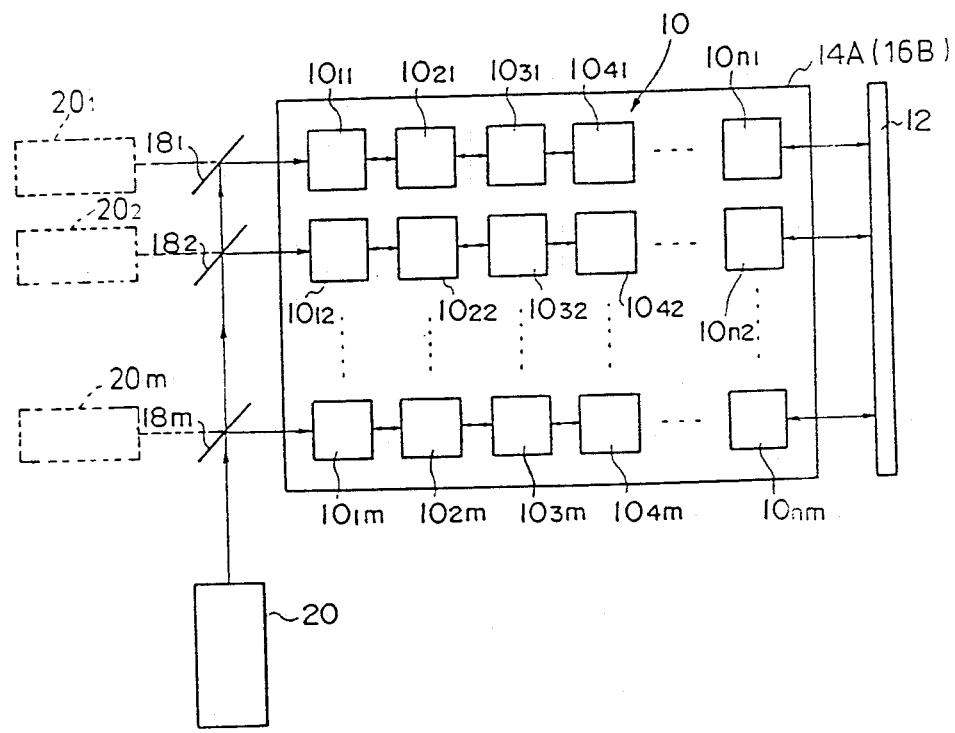
FIG. 16 is a schematic diagram showing a fourth embodiment of the present invention.

In the present embodiment, the optical control element 14A composed of the plural electrodes $E_{11}$, $E_{21}$, - - -, and $E_{nm}$, as have been described with reference to FIG. 10, are interposed between the phase-conjugate element group and a plane mirror 16B, as shown in FIG. 16, such that the electrode rows (taken in the shown horizontal direction) each composed of the n-number of electrodes are arrayed in the main scanning direction.

In the present embodiment, the main scanning is accomplished by sequentially applying the voltages between the adjoining electrodes in the electrode rows, and the auxiliary scanning is accomplished by sequentially changing the electrode rows to be supplied with the voltages.

Incidentally, in the third and fourth embodiments thus far described, the reflecting mirrors are exemplified by the plane mirrors, assuming that the attenuation of the laser beam is little because the distance from the reflecting mirrors constituting the resonator to the recording medium is short. Despite of this fact, however, concave mirrors may be used as the reflecting mirrors. In this modification, the optical control element and the recording medium may preferably be curved so that the concave mirrors, the optical control element and the recording medium may be directed in parallel.

Figure 17:
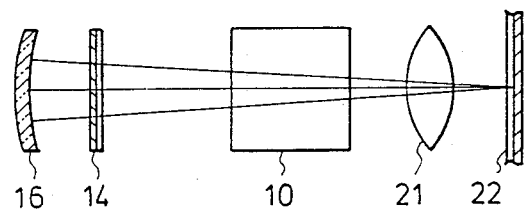
FIG. 17 is a longitudinal sectional view similar to FIG. 2 but shows another embodiment using a scanning lens.
Figure 18:
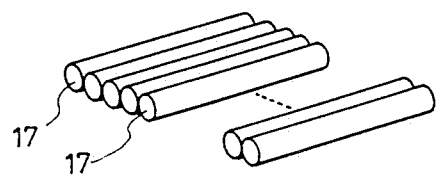
FIG. 18 is a schematic perspective view showing a SELFOC array.

A scanning lens is not used in the foregoing embodiments but may be interposed between the phase-conjugate element and the recording medium. FIG. 17 shows an example in which an $F\theta$ lens 21 acting as the scanning lens is interposed between the phase-conjugate element 10 and the recording medium 22. In this modification, too, the concave mirror 16 may be replaced by a plane mirror. As the scanning lens, the $f\theta$ lens may be replaced by a SELFOC lens (i.e., the trade name of refractive index distribution type lens) array which is composed of a plurality of SELFOC lenses 17 arrayed in the radial direction and which is arrayed to correspond to each of the optical gates, as shown in FIG. 18. Alternatively, a plurality of micro lenses may also be arranged as the scanning lens to correspond to the optical gates, respectively.

Figure 19:
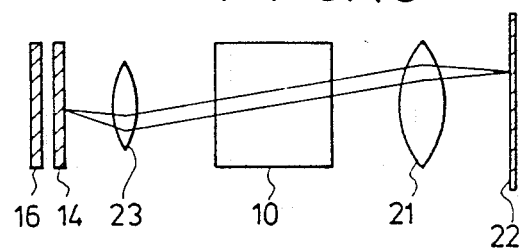
FIG. 19 is a longitudinal sectional view similar to FIG. 17 but shows an embodiment using a condenser lens in place of the scanning lens.

As shown in FIG. 19, moreover, a condenser lens 23 may be interposed between the phase-conjugate element 10 and the optical control element 14. Thanks to the provision of the condenser lens 23, the optical control element 14 can be small-sized because the beam can be condensed at the side of the optical control element 14, too.

Incidentally, the example described above is directed to the structure in which the scanning lens is arranged in the first embodiment. In the second to fourth embodiments, too, the scanning lens may be interposed between the recording medium and the phase-conjugate elements, or the condenser lens may be interposed between the phase-conjugate elements and the optical control element. In case, moreover, the optical control element shown in FIG. 10 and the SELFOC lens array are to be combined, a plurality of SELFOC lens arrays may be arrayed so that each of the SELFOC lenses may correspond to one of the optical gates.

Incidentally, the description thus far made is directed mainly to the light beam scanner for the laser COM, but the present invention should not be limited thereto but can find its applications to the writing or reading operation of an optical disc.

What is claimed is:

1. A light beam scanner comprising:
   a phase-conjugate element;
   a light source for emitting a pumping light beam for exciting said phase-conjugate element;
   a reflecting mirror arranged to have its reflecting face facing said phase-conjugate element; p1 an optical control element interposed between said phase-conjugate element and said reflecting mirror and having a plurality of optical gates juxtaposed to each other in at least one of a main scanning direction and an auxiliary scanning direction; and
   a controller for controlling said optical gates to be opened or closed.

2. A light beam scanner according to claim 1, wherein said optical control element has its plural optical gates juxtaposed to each other in the main scanning direction and is interposed between said phase-conjugate element and said reflecting mirror.

3. A light beam scanner according to claim 1, wherein said optical control element has its plural optical gates juxtaposed to each other in the auxiliary scanning direction and is interposed between said phase-conjugate element and said reflecting mirror.

4. A light beam scanner according to claim 1, wherein said optical control element includes a optical gate group having a plurality of optical gate rows juxtaposed to each other in the auxiliary scanning direction and each composed of a plurality of optical gates juxtaposed to each other in the main scanning direction and is interposed between said phase-conjugate element and said reflecting mirror.

5. A light beam scanner according to claim 1, further comprising:
a scanning means located in optical communication with said phase conjugate element, for condensing the light beam which is oscillated by the resonations between said phase-conjugate element and said reflecting mirror.

6. A light beam scanner according to claim 1, wherein said light source comprises:
a laser oscillator for irradiating said phase-conjugate element with a pumping light beam for exciting said phase-conjugate element; and
a reflecting mirror for reflecting the light beam having passed through said phase-conjugate element to said phase-conjugate element.

7. A light beam scanner according to claim 1, wherein said optical control element further includes:
a polarizer;
an analyzer arranged to have its polarizing face intersecting the polarizing face of said polarizer at a right angle; and
a PLZT substrate interposed between said polarizer and said analyzer and having a plurality of electrodes juxtaposed to each other at a predetermined pitch in the scanning direction.

8. A light beam scanner comprising:
a phase-conjugate element;
a light source for emitting a pumping light beam for exciting said phase-conjugate element;
a concave reflecting mirror arranged to have its reflecting face facing said phase-conjugate element;
an optical control element interposed between said phase-conjugate element and said reflecting mirror and curved along the reflecting face of said concave mirror, said optical control element having a plurality of optical gates juxtaposed to each other in at least one of a main scanning direction and an auxiliary scanning direction; and
a controller for controlling said optical gates to be opened or closed.

9. A light beam scanner according to claim 8, further comprising:
a scanning lens means, located in optical communication with said phase-conjugate element, for condensing the light beam which is oscillated by the resonations between said phase-conjugate element and said reflecting mirror.

10. A light beam scanner comprising:
a phase-conjugate element group composed of a plurality of phase-conjugate elements juxtaposed to each other in a scanning direction;
a light source for emitting a pumping light beam for exciting said plural phase-conjugate elements;
a reflecting mirror arranged to have its reflecting face facing said phase-conjugate element group;
an optical control element interposed between said phase-conjugate element group and said reflecting mirror and having a plurality of optical gates juxtaposed to each other in said scanning direction; and
a controller for controlling said optical gates to be opened or closed.

11. A light beam scanner according to claim 10, wherein said phase-conjugate element group has its plural phase-conjugate elements juxtaposed to each other in a scanning direction comprising a main scanning direction.

12. A light beam scanner according to claim 11, wherein said optical control element has its plural optical gates juxtaposed to each other in the main scanning direction and is interposed between said phase-conjugate element and said reflecting mirror.

13. A light beam scanner according to claim 10, wherein said phase-conjugate element group has its plural phase-conjugate elements juxtaposed to each other in a scanning direction comprising a auxiliary scanning direction.

14. A light beam scanner according to claim 13, wherein said optical control element has its plural optical gates juxtaposed to each other in the auxiliary scanning direction and is interposed between said phase-conjugate element and said reflecting mirror.

15. A light beam scanner according to claim 10, wherein said phase-conjugate element group has its plural phase-conjugate element rows juxtaposed to each other in a scanning direction comprising an auxiliary scanning direction and each having its phase-conjugate elements juxtaposed to each other in a scanning direction comprising a main scanning direction.

16. A light beam scanner according to claim 15, wherein said optical control element includes a optical gate group having a plurality of optical gate rows juxtaposed to each other in the auxiliary scanning direction and each composed of a plurality of optical gates juxtaposed to each other in the main scanning direction and is interposed between said phase-conjugate element and said reflecting mirror.

17. A light beam scanner according to claim 10, further comprising:
a scanning lens means, located in optical communication with said phase-conjugate element, for condensing the light beam which is oscillated by the resonations between said phase-conjugate element and said reflecting mirror.

18. A light beam scanner according to claim 10, wherein said light source includes:
a laser oscillator for irradiating said plural phase-conjugate elements with a pumping light beam for exciting said phase-conjugate element group; and
a reflecting mirror for reflecting the light beam having passed through said phase-conjugate element group to said phase-conjugate element group.

19. A light beam scanner according to claim 10, wherein said optical control element further includes:
a polarizer;
an analyzer arranged to have its polarizing face intersecting the polarizing face of said polarizer at a right angle; and
a PLZT substrate interposed between said polarizer and said analyzer and having a plurality of electrodes juxtaposed to each other at a predetermined pitch in the scanning direction.

* * * * *